United States Patent [19]

Oguchi et al.

[11] Patent Number: 5,138,840
[45] Date of Patent: Aug. 18, 1992

[54] POWER TRANSMISSION APPARATUS FOR INTERNAL COMBUSTION ENGINE INCLUDING SUPERCHARGER

[75] Inventors: Tetsuro Oguchi; Hidetada Fukushima, both of Oyama, Japan

[73] Assignee: Kabushiki Kaisha Komatsu Seisakusho, Japan

[21] Appl. No.: 445,666
[22] PCT Filed: Apr. 7, 1989
[86] PCT No.: PCT/JP89/00376
§ 371 Date: Dec. 5, 1989
§ 102(e) Date: Dec. 5, 1989
[87] PCT Pub. No.: WO89/09873
PCT Pub. Date: Oct. 19, 1989

[30] Foreign Application Priority Data

Apr. 8, 1988 [JP] Japan .................. 85293/1988

[51] Int. Cl.⁵ .................................................. F02G 5/02
[52] U.S. Cl. .................................... 60/624; 60/597
[58] Field of Search .................. 60/624, 597, 598

[56] References Cited

U.S. PATENT DOCUMENTS 4,719,756  1/1988  Streuli .................................. 60/597
4,748,812  6/1988  Okada .................................. 60/624

FOREIGN PATENT DOCUMENTS 171882    6/1985  European Pat. Off. .
3330315   3/1985  Fed. Rep. of Germany .
200033   11/1983  Japan .................................. 60/624
61-82038  5/1986  Japan .
61-175240 8/1986  Japan .
62-55420  3/1987  Japan .
57-129926 5/1987  Japan .
186916    8/1988  Japan .................................. 60/624
116231    5/1989  Japan .................................. 60/624
683589   12/1952  United Kingdom .............. 60/598

OTHER PUBLICATIONS

European Search Report May 1990.

Primary Examiner—Richard A. Bertsch
Assistant Examiner—Peter Korytnyk
Attorney, Agent, or Firm—Welsh & Katz, Ltd.

[57] ABSTRACT

According to the present invention, a power transmission apparatus for an internal combustion engine (2) having a supercharger (1) attached thereto is constructed such that thermal energy included in exhaust gas discharged from a turbine (T) in the supercharger is recovered by a waste heat recovering turbine (3) thereby to drive the waste heat recovering turbine (3), auxiliary units (9), (10) for a cooling system of the internal combustion engine (2) are driven by power generated by the waste heat recovering turbine (3) which has been driven and the power generated by the wasted heat recovering turbine (3) is then transmitted to a crankshaft (12) of the internal combustion engine (2) via a coupling (6) for interrupting power transmission in an operational region where the internal combustion engine is rotated at a low speed or in an operational region where the internal combustion engine is rotated under a low load.

2 Claims, 6 Drawing Sheets

POWER TRANSMISSION APPARATUS FOR INTERNAL COMBUSTION ENGINE INCLUDING SUPERCHARGER

TECHNICAL FIELD

The present invention relates generally to a power transmission apparatus for an internal combustion engine having a supercharger attached thereto and more particularly, to a power transmission apparatus for an internal combustion engine having a supercharger attached thereto wherein power generated by a waste heat recovering turbine driven by exhaust gas discharged from the internal combustion engine via the supercharger is transmitted to a crankshaft of the internal combustion engine whereby output from the internal combustion engine can be increased.

BACKGROUND ART

In general, a power transmission apparatus for an internal combustion engine having a supercharger attached thereto is constructed such that thermal energy included in exhaust gas discharged from a combustion chamber of the internal combustion engine via a turbine of the supercharger is recovered by a waste heat recovering turbine and power generated by the waste heat recovering turbine is transmitted to a crankshaft of the internal combustion engine thereby to increase an output from the internal combustion engine, and various proposals have been heretofore made as to the foregoing type of power transmission apparatus.

With respect to the foregoing type of conventional power transmission apparatus for an internal combustion chamber having a supercharger attached thereto wherein power generated by the waste heat recovering turbine is transmitted to the crankshaft of the internal combustion engine, one proposal is such that power generated by the waste heat recovering turbine is transmitted to the crankshaft of the internal combustion engine via an ordinary fluid coupling. Another proposal is made such that the waste heat recovering turbine is operatively connected to an associated unit via a speed reduction unit and an overrunning clutch and a power transmission apparatus including pulleys and a V-belt extending round the pulleys is operatively mounted on a shaft of the associated unit whereby power generated by a waste heat recovering turbine is transmitted to the crankshaft of the internal combustion engine via the power transmission apparatus.

Namely, with the above-described power transmission apparatus for an internal combustion engine having a supercharger attached thereto, the waste heat recovering turbine is normally connected to the crankshaft of the internal combustion engine via a power transmission passage therebetween.

It should of course be noted that with respect to the conventional power transmission apparatus for an internal combustion engine having a supercharger attached thereto, a part of power generated by the internal combustion engine is used directly as power for driving auxiliary units for a cooling system of the internal combustion engine so as to normally maintain the internal combustion engine in an operative state.

With the above-described conventional power transmission apparatus for an internal combustion engine having a supercharger attached thereto, a part of power generated by the internal combustion engine is consumed directly for driving an auxiliary unit for a cooling system of the internal combustion engine which requires the largest quantity of driving power among a plurality of auxiliary units for maintaining the internal combustion engine in an operative state. Thus, the conventional power transmission apparatus has a drawback that engine output is reduced because of the requirement for generated power.

In the case of a conventional internal combustion engine, usually, there is no need of forcibly cooling the engine in an operational region where the engine is rotated at a low speed or in an operational region where the engine is rotated under a low load. However, the conventional power transmission apparatus for an internal combustion engine having a supercharger attached thereto has a drawback that a large quantity of fuel consumption is normally required for continuously driving auxiliary units for a cooling system of the internal combustion engine even in an operational range where the engine is rotated at a low speed and/or under low load.

Further, with the conventional internal combustion engine having a supercharger attached thereto, due to the fact that a quantity of thermal energy included in exhaust gas delivered to the waste heat recovering turbine via a turbine in the supercharger is very small, few power is generated by the waste heat recovering turbine. However, since a conventional fluid coupling is used for the conventional power transmission apparatus for an internal combustion engine having a supercharger attached thereto, a part of power appearing on the crankshaft of the internal combustion engine is unavoidably consumed for driving the waste heat recovering turbine. Such useless work increases a quantity of fuel consumption. Particularly, in an operational region where the engine is rotated at a low speed, there arise problems that engine output is reduced and the engine has a degraded property of acceleration.

The present invention has been made with the foregoing background in mind and its object resides in providing a power transmission apparatus for an internal combustion engine having a supercharger attached thereto which assures that engine output, particularly, engine output in an operational region where the engine is rotated at a low speed can be increased and a quantity of fuel consumption in an operational region where the engine is rotated at a low speed as well as in an operational region where the engine is rotated under a low load can be reduced.

DISCLOSURE OF THE INVENTION

According to the present invention, a power transmission apparatus for an internal combustion engine having a supercharger attached thereto is constructed such that a waste heat recovering turbine is driven by utilizing thermal energy included in exhaust gas discharged from the internal combustion engine via a turbine in the supercharger, auxiliary units for a cooling system of the internal combustion engine are driven by power generated by the waste heat recovering turbine and moreover the power generated by the waste heat recovering turbine is transmitted to a crankshaft of the internal combustion engine via a fluid coupling adapted to interrupt power transmission in an operational region where the engine is rotated at a low speed or in an operational region where the engine is rotated under a low load. With such a power transmission apparatus as constructed in the above-described manner, since auxiliary units for a cooling system of the internal combustion engine are driven by the waste heat recovering turbine, any part of power generated by the engine is not used directly for driving auxiliary unit for the cooling system. While the engine is rotated in an operational region where it is rotated at a low speed or in an operational region where it is rotated under a low load, power generated by the engine is not transmitted to the waste heat recovering turbine. Consequently, engine output, particularly, engine output in an operational region where the engine is rotated at a low speed can be increased substantially and moreover thermal energy included in exhaust gas can be utilized effectively with the result that a quantity of fuel consumption in an operational region where the engine is rotated at a low speed as well as in an operational region where the engine is rotated under a low load can be reduced substantially.

BEST MODE FOR CARRYING OUT THE INVENTION

Now, the present invention will be described in detail hereinafter with reference to the accompanying drawings which illustrate preferred embodiments thereof.

Figure 1:
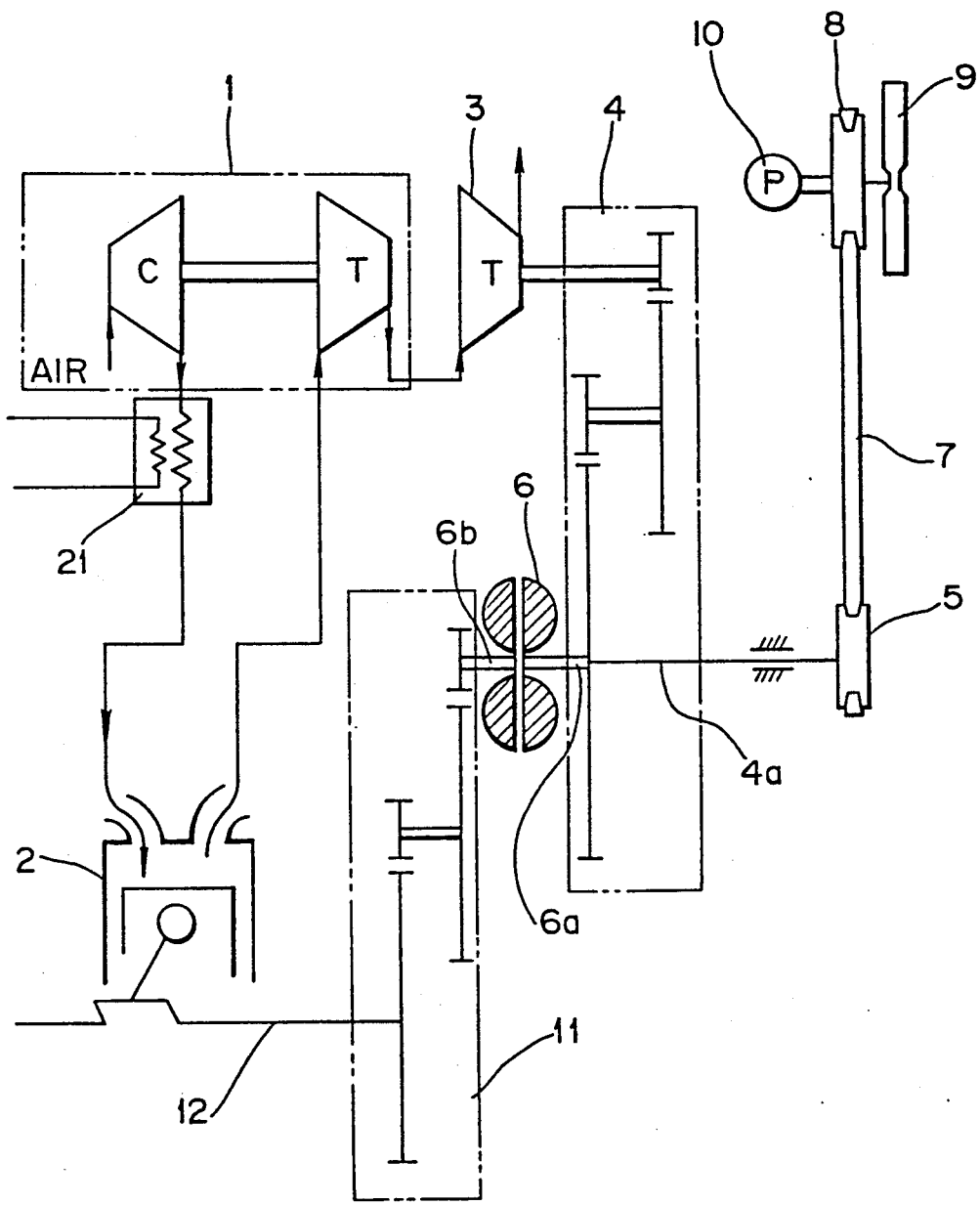
FIG. 1 is a schematic view illustrating a power transmission apparatus for an internal combustion engine having a supercharger attached thereto in accordance with an embodiment of the present invention.

FIG. 1 is an explanatory view which schematically illustrates a power transmission apparatus for an internal combustion engine having a supercharger attached thereto in accordance with an embodiment of the present invention.

In FIG. 1, reference numeral 1 designates a supercharger.

The supercharger 1 drives a compressor C by a turbine T which is driven by exhaust gas. As the compressor C is driven, intake air is compressed by the compressor C and compressed air is then introduced into an engine 2 via an intake port.

On the other hand, exhaust gas leaving the turbine T is introduced into a waste heat recovering turbine 3 so that the waste heat recovering turbine 3 is driven.

As the waste heat recovering turbine 3 is driven by the waste gas which has flowed via the turbine T in the supercharger 1, the resultant power is transmitted to a pulley 5 and a fluid coupling 6 via the power take-out shaft 4a of a gear type speed reduction mechanism 4.

A part of the power of the waste heat recovering turbine 3 which has been transmitted to the pulley 5 is transmitted to a pulley 8 via power transmitting means comprising a V-belt 7 extending between the pulley 5 and the pulley 8, whereby a fun 9 and a cooling water pump 10 serving as auxiliary units fixedly mounted on a shaft of the pulley 8 for the purpose of cooling the engine 2 are driven. Incidentally, in FIG. 1, reference numeral 21 designates an after cooler.

On the other hand, the power which has been transmitted to an input shaft 6a of the fluid coupling 6 is transmitted to a crankshaft 12 of the internal combustion engine 2 via an output shaft 6b of the fluid coupling 6 and a gear type speed reduction mechanism 11 coupled to the output shaft 6b. Since the power outputted from the waste heat recovering turbine 3 is transmitted to the crankshaft 12 of the internal combustion engine 2 in that way, the result is that output from the internal combustion engine 2 is increased. Although the fluid coupling 6 will be described in more details later, reference should be made to the structure of a fluid coupling as disclosed in the specification of Japanese Utility Model Application (Japanese Utility Model Application NO. 166,384/1984) filed by the common applicant to the present invention.

The fluid coupling 6 used for the power transmission apparatus of the present invention is roughly classified into two types.

Figure 4:
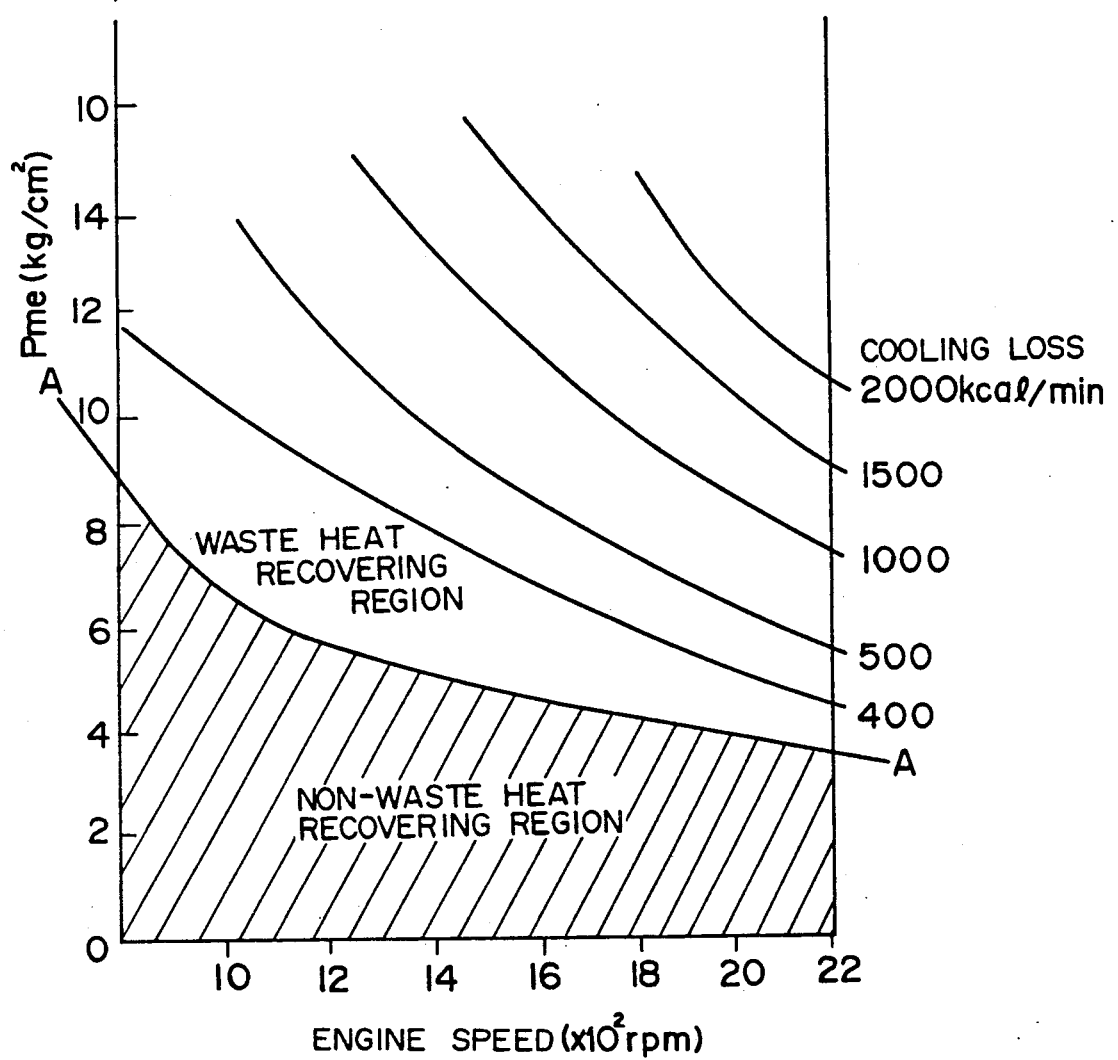
FIG. 4 is a graph illustrating a waste heat recovering region, a non-waste heat recovering region and a constant cooling loss occurring with the internal combustion engine having a supercharger attached thereto.

One of them is a fluid coupling 6 including a mechanism of which structure is such that no power transmission is accomplished between the waste heat recovering turbine 3 and the crankshaft 12 in a non-waste heat recovering region as represented by a number of hatched lines in a graph shown in FIG. 4, i.e., a low rotational speed region and a low load rotational region. The other one is a fluid coupling 6 including a mechanism of which structure is such that an one-way clutch is incorporated in the fluid coupling 6 so as to inhibit power from being transmitted to the waste heat recovery turbine 3 side from the crankshaft 12.

By the way, FIG. 4 is a graph illustrating a waste heat recovering region, a non-waste heat recovering region and constant cooling loss with the internal combustion engine having a supercharger attached thereto.

Figure 5:
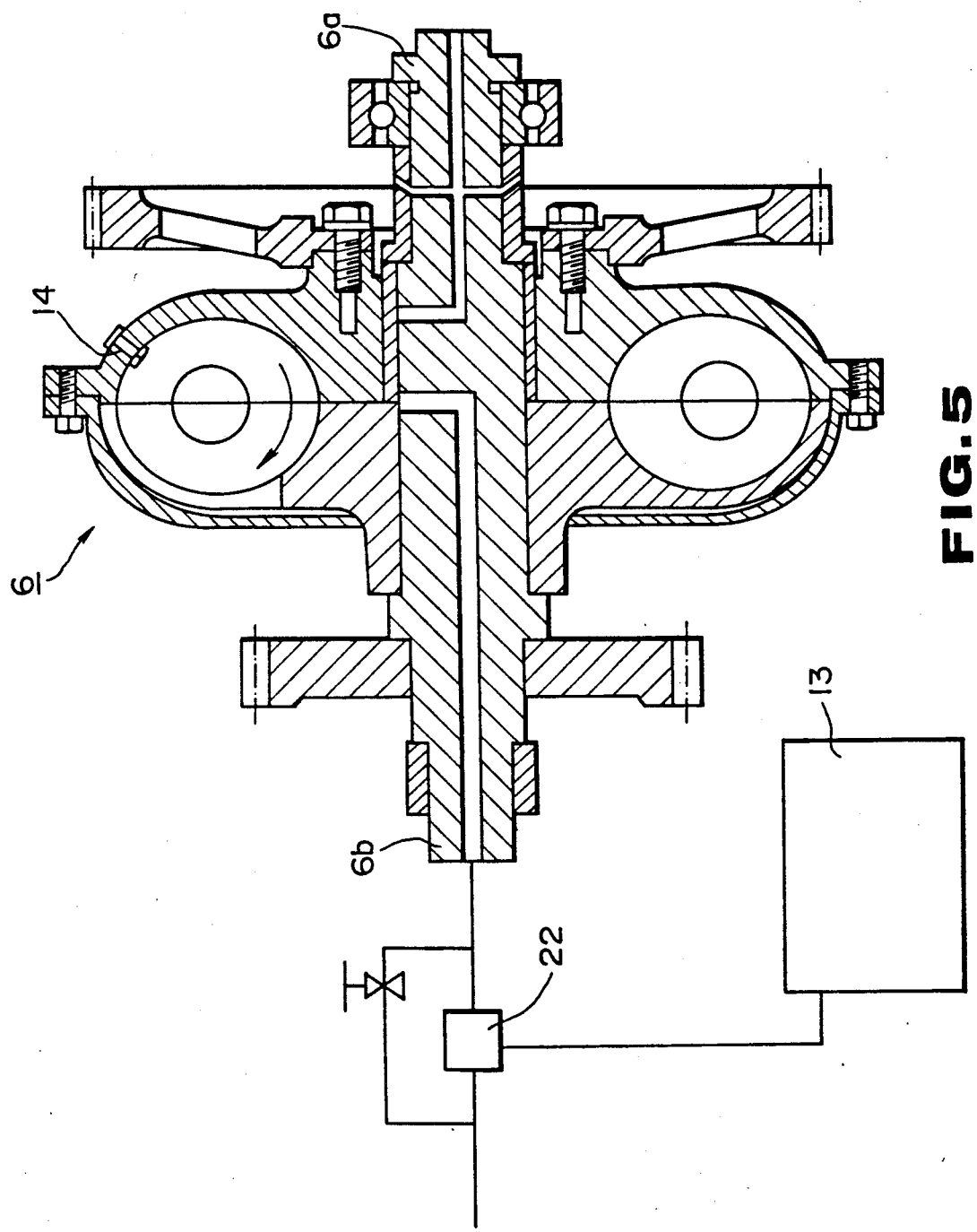
FIG. 5 is a sectional view of a fluid coupling employable for the power transmission apparatus of the present invention to interrupt power transmission in the non-waste heat recovering region.

With respect to the two types of fluid couplings 6 as described above, the fluid coupling 6 of such a type that no power transmission is accomplished between the waste heat recovering turbine 3 and the crankshaft 12 in the non-waste heat recovering region in FIG. 4 is as shown in FIG. 5 which schematically illustrate by way of a sectional view the structure thereof.

In FIG. 5, reference numeral 13 designates a detector for detecting a loading state of the internal combustion engine 2 depending on the temperature of exhaust gas, reference numeral 22 designates a control valve for interrupting rotation of the internal combustion engine 2 and reference numeral 14 designates a centrifugal type valve for interrupting rotation of the engine 2 during rotation thereof at a low rotational speed.

Figure 6:
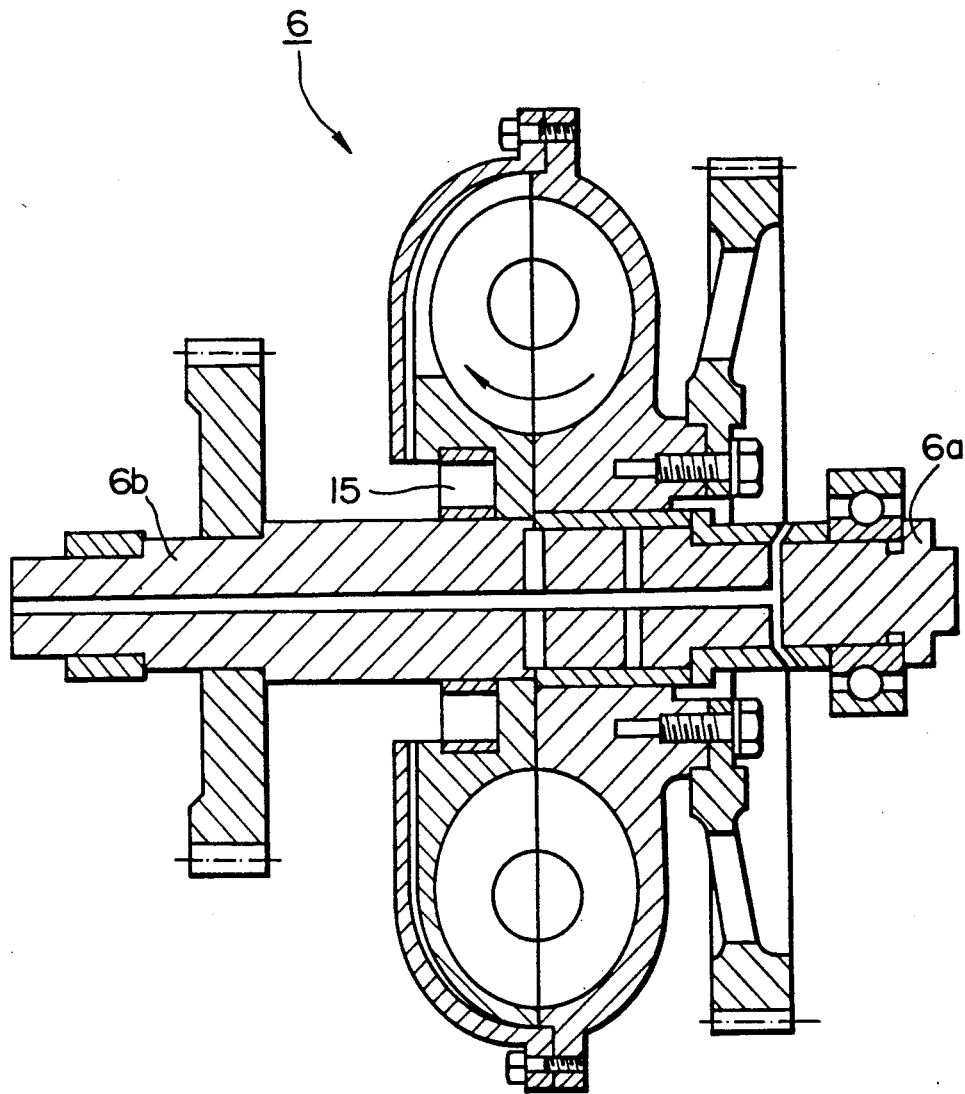
FIG. 6 is a sectional view of another fluid coupling for the power transmission apparatus of the present invention.

Further, the fluid coupling 6 of such a type that transmission of power from the crankshaft 12 to the waste heat recovering turbine 3 side is inhibited is as shown in FIG. 6 which schematically illustrates by way of a sectional view the structure thereof.

In FIG. 6, reference numeral 15 designates a one-way clutch.

Consequently, no power is transmitted from the crankshaft 12 to the waste heat recovering turbine 3 side in the non-waste heat recovering region shown in FIG. 4, even when either one of the foregoing two types of fluid couplings is used for the fluid coupling 6 for the purpose of power transmission in the internal combustion engine having the supercharger attached thereto shown in FIG. 1.

Next, operation of the above-described power transmission apparatus for an internal combustion engine having a supercharger attached thereto will be described below.

With the power transmission apparatus for the internal combustion engine having a supercharger attached thereto as shown in FIG. 1, power outputted from the waste heat recovering turbine 3 in the waste heat recovering region in FIG. 4 is transmitted to an input shaft 6a of the fluid coupling 6 via an output shaft 4a of the gear type speed reduction mechanism 4 and the thus transmitted power is transmitted further to the crankshaft 12 via an output shaft 6b of the fluid coupling 6 and the gear type speed reduction mechanism 11 operatively connected to the output shaft 6b of the fluid coupling 6. As a result, output from the internal combustion engine 2 can be increased. A part of power derived from the waste heat recovering turbine 3 is transmitted to the engine cooling fan 6 and the cooling water pump 10 serving as auxiliary units for the cooling system via the gear type speed reduction mechanism 4, the pulleys 5 and 8 and the V-belt 7 extending between the both pulleys 5 and 8, whereby the engine cooling fan 9 and the cooling water pump 10 are driven.

On the other hand, since no power is transmitted from the crankshaft 12 to the waste heat recovering turbine 3 via the fluid coupling 6 in the non-waste heat recovering region, i.e., in the low rotational speed region and the low loading region, the waste heat recovering turbine 3 does not serve as a load with which output from the internal combustion engine is uselessly consumed in the non-waste heat recovering region. In addition, since the engine cooling fan 9 and the cooling water pump 10 are not actuated by the internal combustion engine 2 in the non-waste heat recovering region, power outputted from the internal combustion engine 2 is not used for driving the waste heat recovering turbine 3 and for driving auxiliary units for the cooling system of the internal combustion engine 2. Thus, output from the internal combustion engine 2 particularly in the low rotational speed region can be increased and a quantity of fuel consumed by the internal combustion engine 2 in the low speed rotational region and the low load rotational region can be reduced.

It should be noted that a curve A—A indicative of a constant cooling loss shown in the graph in FIG. 4 represents a boundary line at which the cooling loss of the internal combustion engine 2 becomes a quantity of heat which is uselessly scattered in a natural cooling state without recirculation of cooling water. As is apparent from the graph, the curve A—A assumes the substantially same value as that at the boundary of a waste heat covering region. This makes it possible to drive the engine cooling fan 9 and the cooling water pump 10 with the aid of the waste heat recovering turbine 3.

With the power transmission apparatus as described above with reference to FIG. 1, the engine cooling fan 9 and the cooling water pump P serving as auxiliary units for the cooling system can be driven by waste heat and their operation can be stopped in an operational region where no cooling is required.

Figure 2:
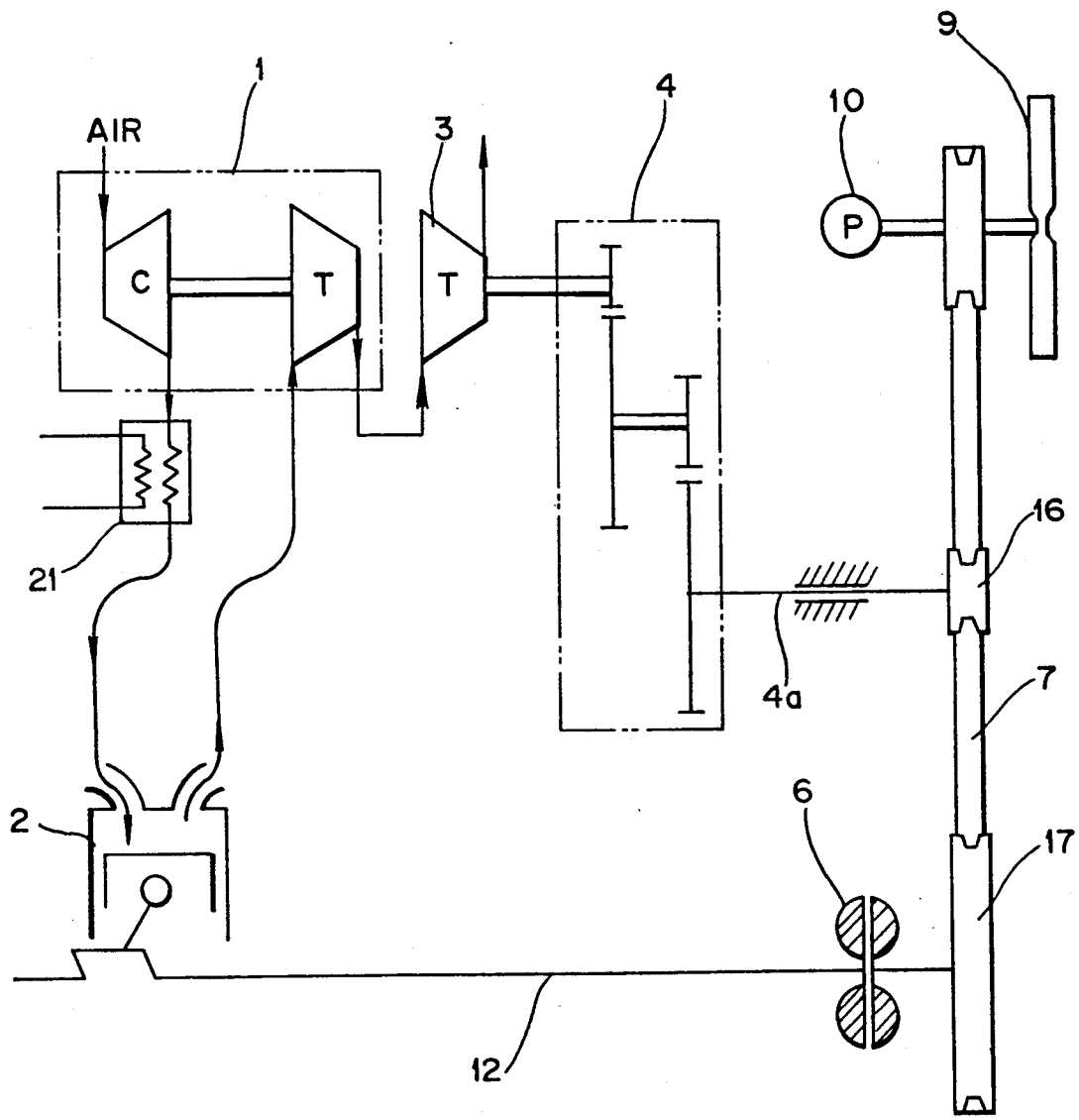
FIG. 2 is a schematic view illustrating a power transmission apparatus for an internal combustion engine having a supercharger attached thereto in accordance with other embodiment of the present invention.

FIG. 2 is an explanatory view which schematically illustrates a power transmission apparatus for an internal combustion engine having a supercharger attached thereto in accordance with other embodiment of the present invention. Same or similar components as those in FIG. 1 are represented by same reference numerals.

In FIG. 2, reference numeral 16 designates a driving pulley fixedly mounted on the output shaft 4a of the gear type speed reduction mechanism 4. Power outputted from the waste heat recovering turbine 3 is transmitted to the pulley 16 via the gear type speed reduction mechanism 4 and the thus transmitted power is transmitted further to a crank pulley 17 as well as the engine cooling fan 9 and the cooling water pump 10 serving as auxiliary units for the cooling system via the V-belt 7 or the like means. A fluid coupling 6 having the same structure as that in the foregoing embodiment is interposed between the crank pulley 17 and the crankshaft 12 so that power outputted from the waste heat recovering turbine 3 is transmitted to the crankshaft 12 of the internal combustion engine 12 via the fluid coupling 6.

Other structure and function in FIG. 2 are same as those of the power transmission apparatus shown in FIG. 1. However, since power outputted from the waste heat recovering turbine 3 is transmitted to the crankshaft 12 via the V-belt 7 or the like means, the gear type speed reduction mechanism 11 shown in FIG. 1 is not required. Consequently, the power transmission apparatus has an advantageous feature that it is simple in structure.

According to the embodiment shown in FIG. 2, a simple one-way clutch may be substituted for the fluid coupling 6 in the case of a small-sized engine wherein power transmission is accomplished by a V-belt or the like means.

Figure 3:
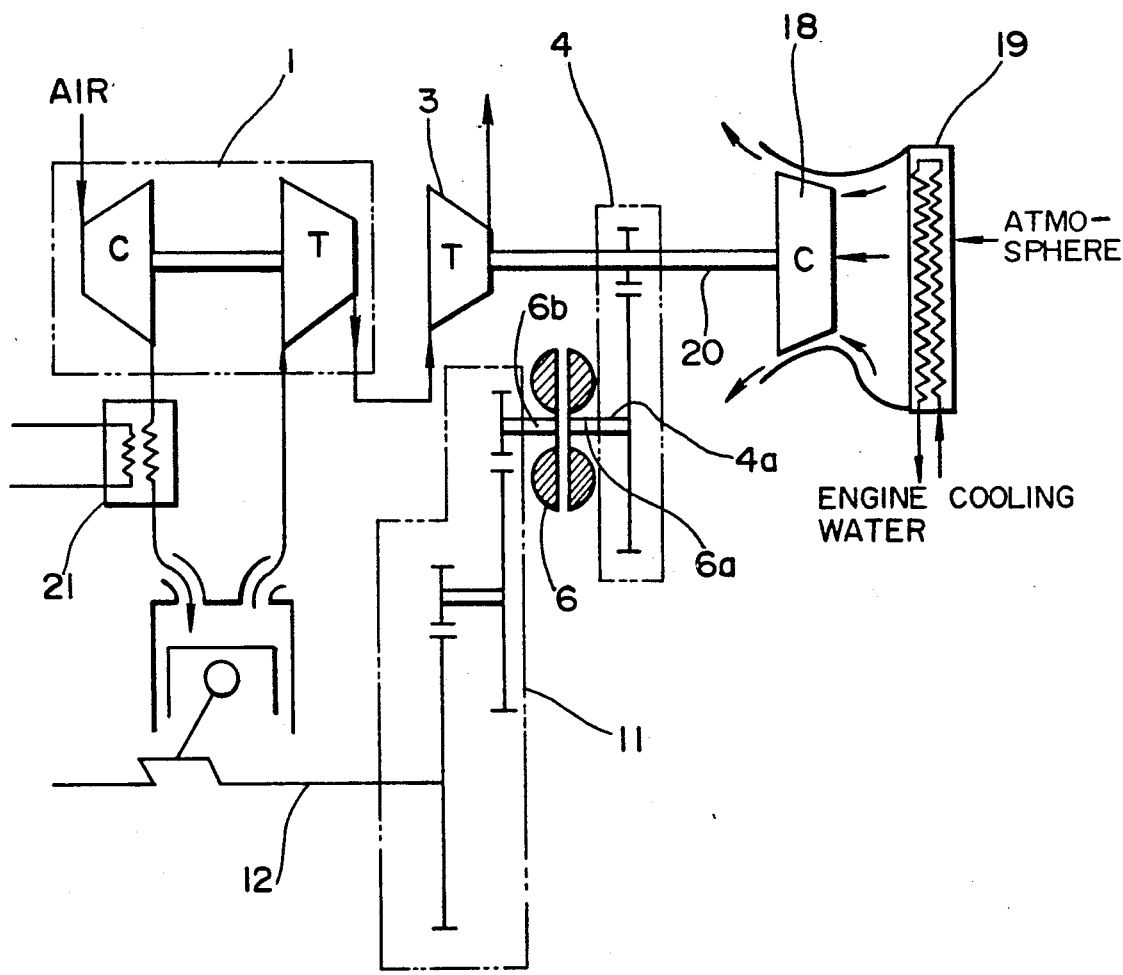
FIG. 3 is a schematic view illustrating a power transmission apparatus for an internal combustion engine in accordance with another embodiment of the present invention.

FIG. 3 is an explanatory view which schematically illustrates a power transmission apparatus for an internal combustion engine having a supercharger attached thereto in accordance with another embodiment of the present invention. Same or similar components as those in FIG. 1 are represented by same reference numerals.

In FIG. 3, reference numeral 18 designates a cooling blower. The cooling blower 18 is connected directly to an output shaft 20 of the waste heat recovering turbine 3 so that it allows cooling air to flow through a radiator 19 for cooling engine cooling water. A gear type speed reduction mechanism 4 is arranged midway of the output shaft 20 for driving the cooling blower 18. Thus, power output from the waste heat recovering turbine 3 is transmitted to the input shaft 6a of a fluid coupling 6 having the same structure as that in the preceding embodiments via an output shaft 4a of the gear type speed reduction mechanism 4. Power from the waste heat recovering turbine 3 transmitted to the fluid coupling 6 in that way is transmitted further to a crankshaft 12 from an output shaft 6b of the fluid coupling 6 via a gear type speed reduction mechanism 11. Other structure and function are same as those shown in FIG. 1. According to the embodiment in FIG. 3, the power transmission apparatus has an advantageous feature that its structure is simplified. A cooling pump (not shown) is mounted on the internal combustion engine in the same manner as is the case with a conventional internal combustion engine.

As will be readily apparent from the above description, the present invention has provided a power transmission apparatus for an internal combustion engine attached thereto, wherein power generated by a waste heat recovering turbine is transmitted to a crankshaft via a fluid coupling to increase output from the internal combustion engine and moreover a part of the generated power is utilized to drive auxiliary units in the cooling system with the result that waste energy can be utilized effectively. Further, since the power transmission apparatus of the present invention is provided with a fluid coupling for interrupting power transmission in the non-waste heat recovering region, this arrangement prevents the waste heat recovering turbine from being driven by the internal combustion engine in the non-waste heat recovering region, whereby energy loss can be reduced. Thus, properties of the engine during running under a low load as well as in an accelerated state can be improved and moreover a quantity of fuel consumption can be reduced.

It should of course be understood that the present invention should not be limited only to the illustrated embodiments but various changes or modifications may adequately be made without departure from the scope of the invention as defined by the appended claims.

INDUSTRIAL APPLICABILITY

As described above, a power transmission apparatus for an internal combustion engine having a supercharger attached thereto is preferably employable for an internal combustion engine having a supercharger attached thereto for which an increased output from the engine and a reduced quantity of fuel consumption have been heretofore required.

What is claimed is:

1. A power transmission apparatus for an internal combustion engine having a supercharger attached thereto wherein thermal energy included in exhaust gas is recovered by a waste heat recovering turbine and power generated by said waste heat recovering turbine is transmitted to a crankshaft of the internal combustion engine, characterized in that an output shaft of the waste heat recovering turbine is connected to a gear type speed reduction mechanism, a pulley is fixedly mounted on one end part of a power take-out shaft of said gear type speed reduction mechanism, auxiliary units for a cooling system of the internal combustion engine are driven via a V-belt extending round said pulley and the input shaft of a fluid coupling is arranged at the other end of said power take-out shaft of the gear type speed reduction mechanism to interrupt power transmission during rotation of the internal combustion engine at a low rotational speed and during rotation of the internal combustion engine under a low load, whereby the power transmitted via the output shaft of the fluid coupling is transmitted further to the crankshaft via another gear type speed reduction mechanism.

2. A power transmission apparatus for an internal combustion engine having a supercharger attached thereto wherein thermal energy included in exhaust gas is recovered by a waste heat recovering turbine and power generated by said waste heat recovering turbine is transmitted to a crankshaft of the internal combustion engine, characterized in that an output shaft of said waste heat recovering turbine is connected to a gear type speed reduction mechanism, a pulley is fixedly mounted on a power take-out shaft of said gear type speed reduction mechanism so as to drive auxiliary units for a cooling system of the internal combustion engine via a V-belt extending round said pulley, a shaft of said pulley round which said V-belt extends is coupled to the input shaft of a fluid joint for interrupting power transmission during rotation of the internal combustion engine at a low rotational speed or during rotation of the internal combustion engine under a low load and an output shaft of said fluid coupling is connected directly to the crankshaft of the internal combustion engine.

* * * * *